US012499847B2

(12) United States Patent
Lee et al.

(10) Patent No.: US 12,499,847 B2
(45) Date of Patent: Dec. 16, 2025

(54) DISPLAY DEVICE

(71) Applicant: LG ELECTRONICS INC., Seoul (KR)

(72) Inventors: Kyong Hoon Lee, Seoul (KR); Sang Soo Hwang, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 18/521,186

(22) Filed: Nov. 28, 2023

(65) Prior Publication Data

US 2025/0014527 A1 Jan. 9, 2025

(30) Foreign Application Priority Data

Jul. 6, 2023 (KR) ........................ 10-2023-0087625
Sep. 8, 2023 (KR) ........................ 10-2023-0119426

(51) Int. Cl.
*G09G 3/34* (2006.01)
*G09G 3/32* (2016.01)

(52) U.S. Cl.
CPC ............... *G09G 3/342* (2013.01); *G09G 3/32* (2013.01); *G09G 2320/02* (2013.01); *G09G 2320/0626* (2013.01); *G09G 2330/021* (2013.01); *G09G 2330/028* (2013.01); *G09G 2360/16* (2013.01)

(58) Field of Classification Search
CPC ...... G09G 3/342; G09G 3/32; G09G 2320/02; G09G 2320/0626; G09G 2330/021; G09G 2330/028; G09G 2360/16
See application file for complete search history.

(56) References Cited

U.S. PATENT DOCUMENTS

| | | | | |
|---|---|---|---|---|
| 8,681,088 B2 | 3/2014 | Park | | |
| 10,510,304 B2 | 12/2019 | Dunn et al. | | |
| 10,914,981 B2 | 2/2021 | Yoshinaga et al. | | |
| 11,929,044 B1 * | 3/2024 | Qiu | G09G 3/3426 | |
| 2002/0071140 A1 * | 6/2002 | Suzuki | H04N 1/4051 | 358/3.01 |
| 2007/0146344 A1 * | 6/2007 | Martin | G09G 5/00 | 345/173 |
| 2009/0058792 A1 * | 3/2009 | Park | G09G 3/32 | 345/102 |
| 2011/0163691 A1 * | 7/2011 | Dunn | H05B 45/18 | 315/297 |

(Continued)

FOREIGN PATENT DOCUMENTS

| | | |
|---|---|---|
| CN | 115547246 | 12/2022 |
| JP | 08038267 | 2/1996 |

(Continued)

OTHER PUBLICATIONS

European Patent Office Application Serial No. 24159265.8, Search Report dated Jun. 11, 2024, 8 pages.

(Continued)

*Primary Examiner* — Ariel A Balaoing
(74) *Attorney, Agent, or Firm* — LEE, HONG, DEGERMAN, KANG & WAIMEY

(57) ABSTRACT

The object of the present disclosure aims to reduce power consumption and improve resolution and contrast ratio by implementing a smaller unit block for dimming in the area that the user perceives as the main area.

10 Claims, 19 Drawing Sheets

(56) References Cited

U.S. PATENT DOCUMENTS

| | | | | |
|---|---|---|---|---|
| 2012/0127210 | A1* | 5/2012 | Huang | H05B 45/38 315/186 |
| 2012/0200228 | A1 | 8/2012 | Fujita | |
| 2013/0265346 | A1* | 10/2013 | Yu | G09G 3/3426 345/691 |
| 2015/0084983 | A1* | 3/2015 | Croxford | G06F 1/3265 345/619 |
| 2017/0373122 | A1* | 12/2017 | Chen | H01L 25/075 |
| 2018/0061341 | A1* | 3/2018 | Kang | G09G 3/3685 |
| 2019/0228722 | A1 | 7/2019 | Jeong et al. | |
| 2020/0243025 | A1* | 7/2020 | Xi | G09G 3/3426 |
| 2021/0319760 | A1* | 10/2021 | Lee | G09G 3/3413 |
| 2021/0407441 | A1* | 12/2021 | Gu | G09G 3/3426 |
| 2022/0101805 | A1* | 3/2022 | Hsu | G09G 3/3413 |
| 2023/0274710 | A1* | 8/2023 | Chen | G09G 3/32 345/690 |
| 2024/0112643 | A1* | 4/2024 | Lee | G09G 3/36 |

FOREIGN PATENT DOCUMENTS

| | | |
|---|---|---|
| JP | 2013054195 | 3/2013 |
| JP | 2020053270 | 4/2020 |
| KR | 1020090108461 | 10/2009 |
| KR | 1020110067352 | 6/2011 |
| KR | 1020110107611 | 10/2011 |
| KR | 1020130030877 | 3/2013 |
| KR | 101675840 | 11/2016 |
| KR | 101839327 | 3/2018 |
| KR | 1020190106910 | 9/2019 |
| WO | 2011052556 | 5/2011 |
| WO | 2012090808 | 7/2012 |
| WO | 2022190235 | 9/2022 |
| WO | 2023228978 | 11/2023 |

OTHER PUBLICATIONS

Korean Intellectual Property Office Application No. 10-2023-0119426, Office Action dated Jun. 21, 2024, 6 pages.

Japan Patent Office Application No. 2023-216349, Office Action dated Sep. 10, 2024, 14 pages.

IP Australia Application Serial No. 2023277999, Office Action dated Nov. 15, 2024, 10 pages.

PCT International Application No. PCT/KR2023/011158, International Search Report dated Apr. 19, 2023, 10 pages.

Japan Patent Office Application No. 2023-216349, Office Action dated Mar. 25, 2025, 4 pages.

Japan Patent Office Application No. 2023-216349, Notice of Allowance dated Sep. 2, 2025, 4 pages.

* cited by examiner

DISPLAY DEVICE

CROSS-REFERENCE TO RELATED APPLICATION

Pursuant to 35 U.S.C. § 119, this application claims the benefit of earlier filing date and right of priority to Korean Application No(s). 10-2023-0087625, filed on Jul. 6, 2023, and 10-2023-0119426, filed on Sep. 8, 2023, the contents of which are all incorporated by reference herein in their entirety.

TECHNICAL FIELD

The present disclosure relates to a display device, and more particularly, to a display device that performs local dimming.

BACKGROUND ART

An active matrix liquid crystal display device displays moving images using a thin film transistor (hereafter, referred to as a "TFT") that is a switching element.

A liquid crystal display device can be manufactured in a small size, as compared with a Cathode Ray Tube (CRT), so it is used for not only a portable information device, an office device, and a display device such as a computer, but also a television. Accordingly, the liquid crystal display device has rapidly replaced the CRT.

A transmissive liquid crystal display device that occupies most of liquid crystal display devices displays an image by modulating light from a backlight unit by controlling an electric field that is applied to a liquid crystal layer.

Meanwhile, backlight dimming methods have been proposed to reduce power consumption of a backlight unit. Local dimming, which is one of the backlight dimming methods, may improve contrast by locally controlling luminance of a display surface within one frame period.

The local dimming method may be a method for separating input image data according to virtual blocks divided in a matrix form on a display screen of a liquid crystal display panel, deriving a representative value of the input image data for each block, and adjusting a dimming value for each block according to the representative value for each block so as to control the brightness of light sources of a backlight unit for each block.

Conventionally, all unit blocks are arranged with a constant size. In order to increase dimming resolution, it is advantageous to have a small unit block size.

However, when the size of the unit block becomes smaller, the LEDs must be arranged more densely, which increases the number of LEDs, resulting in increased manufacturing cost and power consumption, and increased heat generation.

Conversely, when the size of the unit block increases, the resolution decreases, which causes a problem in that the contrast ratio of the peripheral part of the image decreases.

In addition, it is possible to divide the size of the unit block into smaller pieces while maintaining the total number of LEDs, but in this case, the number of LEDs in the unit block becomes smaller, resulting in lower resolution.

SUMMARY

Technical Problem

An object of the present disclosure aims to reduce power consumption and improve resolution and contrast ratio by implementing a smaller unit block for dimming in the area that the user perceives as the main area.

The purpose of the present disclosure is to implement different size of unit blocks in the central area and outer area other than the central area of the display panel.

Technical Solution

A display device according to an embodiment of the present disclosure may comprise: a power supply; a display panel configured to output an image; a backlight unit including a plurality of unit blocks that provide light to the display panel, each of the plurality of unit blocks including a plurality of LEDs; and a backlight dimming controller configured to control a light output from the backlight unit to correspond to the image output through the display panel, wherein the entire area of the display panel is divided into a first local area including a plurality of first unit blocks and a second local area including a plurality of second unit blocks, wherein the power supply is configured to: supply a first driving voltage to a first unit block in the first local area, and supply a second driving voltage different from the first driving voltage to a second unit block in the second local area.

Advantageous Effects

According to the present disclosure, power consumption can be saved by reducing the number of LEDs compared to a case where the entire screen area is composed of unit blocks of the same size.

In addition, by designing the size of the unit block in the central area perceived by the viewer to be small, not only does resolution increase, but the contrast ratio in the peripheral area of the displayed image is improved, thereby improving picture quality.

DETAILED DESCRIPTION

Hereinafter, embodiments relating to the present disclosure will be described in detail with reference to the drawings. The suffixes "module" and "unit" for components used in the description below are assigned or mixed in consideration of easiness in writing the specification and do not have distinctive meanings or roles by themselves.

Hereinafter, the present invention will be described in detail with reference to the drawings.

The suffixes "module" and "unit" for components used in the description below are assigned or mixed in consideration of easiness in writing the specification and do not have distinctive meanings or roles by themselves.

It will be understood that, although the terms first, second, etc. may be used herein to describe various elements of the present invention, these terms are only used to distinguish one element from another element and essential, order, or sequence of corresponding elements are not limited by these terms.

A singular representation may include a plural representation unless context clearly indicates otherwise.

It will be understood that the terms "comprise", "include", etc., when used in this specification, specify the presence of several components or several steps and part of the components or steps may not be included or additional components or steps may further be included.

Figure 1:
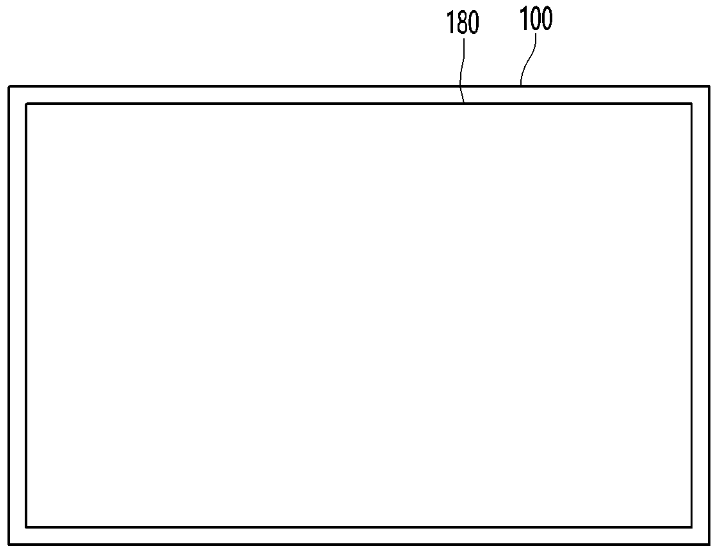
FIG. 1 is a diagram illustrating a display device according to an embodiment of the present invention.

FIG. 1 is a diagram illustrating a display device according to an embodiment of the present invention.

With reference to the drawings, a display device 100 includes a display 180.

On the other hand, the display 180 is realized by one among various panels. For example, the display 180 is one of the following panels: a liquid crystal display panel (LCD panel), an organic light-emitting diode (OLED) panel (OLED panel), and an inorganic light-emitting diode (ILED) panel (ILED panel).

According to the present invention, the display 180 is assumed to include a liquid crystal display panel (LCD panel).

On the other hand, examples of the display device 100 in FIG. 1 include a monitor, a TV, a tablet PC, a mobile terminal, and so on.

Figure 2:
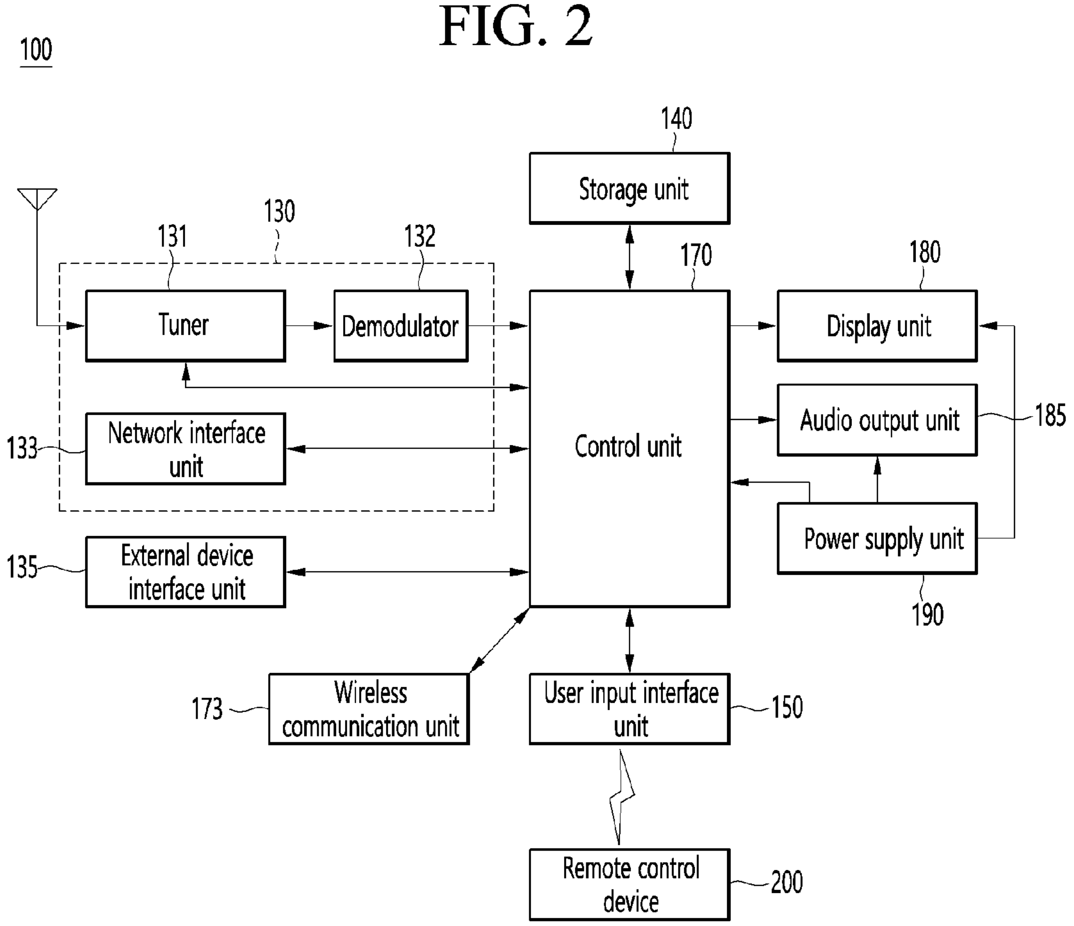
FIG. 2 is an example of a block diagram of the inside of the display device in FIG. 1.

FIG. 2 is an example of a block diagram of the inside of the display device in FIG. 1.

Referring to FIG. 2, a display device 100 can include a broadcast receiver 130, an external device interface 135, a storage 140, a user input interface 150, a controller 170, a wireless communication interface 173, a display 180, an audio output interface 185, and a power supply 190.

The broadcast receiver 130 can include a tuner 131, a demodulator 132, and a network interface 133.

The tuner 131 can select a specific broadcast channel according to a channel selection command. The tuner 131 can receive broadcast signals for the selected specific broadcast channel.

The demodulator 132 can divide the received broadcast signals into video signals, audio signals, and broadcast program related data signals and restore the divided video signals, audio signals, and data signals to an output available form.

The network interface 133 can provide an interface for connecting the display device 100 to a wired/wireless network including internet network. The network interface 133 can transmit or receive data to or from another user or another electronic device through an accessed network or another network linked to the accessed network.

The network interface 133 can access a predetermined webpage through an accessed network or another network linked to the accessed network. That is, it can transmit or receive data to or from a corresponding server by accessing a predetermined webpage through network.

Then, the network interface 133 can receive contents or data provided from a content provider or a network operator. That is, the network interface 133 can receive contents such as movies, advertisements, games, VODs, and broadcast signals, which are provided from a content provider or a network provider, through network and information relating thereto.

Additionally, the network interface 133 can receive firmware update information and update files provided from a network operator and transmit data to an internet or content provider or a network operator.

The network interface 133 can select and receive a desired application among applications open to the air, through network.

The external device interface 135 can receive an application or an application list in an adjacent external device and deliver it to the controller 170 or the storage 140.

The external device interface 135 can provide a connection path between the display device 100 and an external device. The external device interface 135 can receive at least one of image and audio outputted from an external device that is wirelessly or wiredly connected to the display device 100 and deliver it to the controller. The external device interface 135 can include a plurality of external input terminals. The plurality of external input terminals can include an RGB terminal, at least one High Definition Multimedia Interface (HDMI) terminal, and a component terminal.

An image signal of an external device inputted through the external device interface 135 can be outputted through the display 180. A sound signal of an external device inputted through the external device interface 135 can be outputted through the audio output interface 185.

An external device connectable to the external device interface 135 can be one of a set-top box, a Blu-ray player, a DVD player, a game console, a sound bar, a smartphone, a PC, a USB Memory, and a home theater system but this is just exemplary.

Additionally, some content data stored in the display device 100 can be transmitted to a user or an electronic device, which is selected from other users or other electronic devices pre-registered in the display device 100.

The storage 140 can store signal-processed image, voice, or data signals stored by a program in order for each signal processing and control in the controller 170.

Additionally, the storage 140 can perform a function for temporarily store image, voice, or data signals outputted from the external device interface 135 or the network interface 133 and can store information on a predetermined image through a channel memory function.

The storage 140 can store an application or an application list inputted from the external device interface 135 or the network interface 133.

The display device 100 can play content files (for example, video files, still image files, music files, document files, application files, and so on) stored in the storage 140 and provide them to a user.

The user input interface 150 can deliver signals inputted from a user to the controller 170 or deliver signals from the controller 170 to a user. For example, the user input interface 150 can receive or process control signals such as power on/off, channel selection, and screen setting from the remote controller 200 or transmit control signals from the controller 170 to the remote controller 200 according to various communication methods such as Bluetooth, Ultra Wideband (WB), ZigBee, Radio Frequency (RF), and IR.

Additionally, the user input interface 150 can deliver, to the controller 170, control signals inputted from local keys (not shown) such as a power key, a channel key, a volume key, and a setting key.

Image signals that are image-processed in the controller 170 can be inputted to the display 180 and displayed as an image corresponding to corresponding image signals. Additionally, image signals that are image-processed in the controller 170 can be inputted to an external output device through the external device interface 135.

Voice signals processed in the controller 170 can be outputted to the audio output interface 185. Additionally, voice signals processed in the controller 170 can be inputted to an external output device through the external device interface 135.

Besides that, the controller 170 can control overall operations in the display device 100.

Additionally, the controller 170 can control the display device 100 by a user command or internal program inputted through the user input interface 150 and download a desired application or application list into the display device 100 in access to network.

The controller 170 can output channel information selected by a user together with processed image or voice signals through the display 180 or the audio output interface 185.

Additionally, according to an external device image playback command received through the user input interface 150, the controller 170 can output image signals or voice signals of an external device such as a camera or a camcorder, which are inputted through the external device interface 135, through the display 180 or the audio output interface 185.

Moreover, the controller 170 can control the display 180 to display images and control broadcast images inputted through the tuner 131, external input images inputted through the external device interface 135, images inputted through the network interface, or images stored in the storage 140 to be displayed on the display 180. In this case, an image displayed on the display 180 can be a still image or video and also can be a 2D image or a 3D image.

Additionally, the controller 170 can play content stored in the display device 100, received broadcast content, and external input content inputted from the outside, and the content can be in various formats such as broadcast images, external input images, audio files, still images, accessed web screens, and document files.

Moreover, the wireless communication interface 173 can perform a wired or wireless communication with an external electronic device. The wireless communication interface 173 can perform short-range communication with an external device. For this, the wireless communication interface 173 can support short-range communication by using at least one of Bluetooth™, Radio Frequency Identification (RFID), Infrared Data Association (IrDA), Ultra Wideband (UWB), ZigBee, Near Field Communication (NFC), Wireless-Fidelity (Wi-Fi), Wi-Fi Direct, and Wireless Universal Serial Bus (USB) technologies. The wireless communication interface 173 can support wireless communication between the display device 100 and a wireless communication system, between the display device 100 and another display device 100, or between networks including the display device 100 and another display device 100 (or an external server) through wireless area networks. The wireless area networks can be wireless personal area networks.

Herein, the other display device 100 can be a mobile terminal such as a wearable device (for example, a smart watch, a smart glass, and a head mounted display (HMD)) or a smartphone, which is capable of exchanging data (or inter-working) with the display device 100. The wireless communication interface 173 can detect (or recognize) a communicable wearable device around the display device 100. Furthermore, if the detected wearable device is a device authenticated to communicate with the display device 100, the controller 170 can transmit at least part of data processed in the display device 100 to the wearable device through the wireless communication interface 173. Accordingly, a user of the wearable device can use the data processed in the display device 100 through the wearable device.

The display 180 can convert image signals, data signals, or OSD signals, which are processed in the controller 170, or images signals or data signals, which are received in the external device interface 135, into R, G, and B signals to generate driving signals.

Furthermore, the display device 100 shown in FIG. 2 is just one embodiment of the present invention and thus, some of the components shown can be integrated, added, or omitted according to the specification of the actually implemented display device 100.

That is, if necessary, two or more components can be integrated into one component or one component can be divided into two or more components and configured. Additionally, a function performed by each block is to describe an embodiment of the present invention and its specific operation or device does not limit the scope of the present invention.

According to another embodiment of the present invention, unlike FIG. 2, the display device 100 can receive images through the network interface 133 or the external device interface 135 and play them without including the tuner 131 and the demodulator 132.

For example, the display device 100 can be divided into an image processing device such as a set-top box for receiving broadcast signals or contents according to various network services and a content playback device for playing contents inputted from the image processing device.

In this case, an operating method of a display device according to an embodiment of the present invention described below can be performed by one of the display device described with reference to FIG. 2, an image processing device such as the separated set-top box, and a content playback device including the display 180 and the audio output interface 185.

The audio output interface 185 receives the audio processed signal from the controller 170 and outputs the sound.

The power supply 190 supplies the corresponding power throughout the display device 100. In particular, the power supply 190 supplies power to the controller 170 that can be implemented in the form of a System On Chip (SOC), a display 180 for displaying an image, and the audio output interface 185 for outputting audio or the like.

Specifically, the power supply 190 may include a converter for converting an AC power source into a DC power source, and a dc/dc converter for converting a level of the DC source power.

The remote controller 200 transmits a user input to the user input interface 150. To this end, the remote controller 200 may use Bluetooth, radio frequency (RF) communication, infrared (IR) communication, ultra wideband (UWB), ZigBee, or the like. In addition, the remote controller 200 may receive video, audio, or data signal output from the user input interface 150 and display the video, audio, or data signal or output sound.

Figure 3:
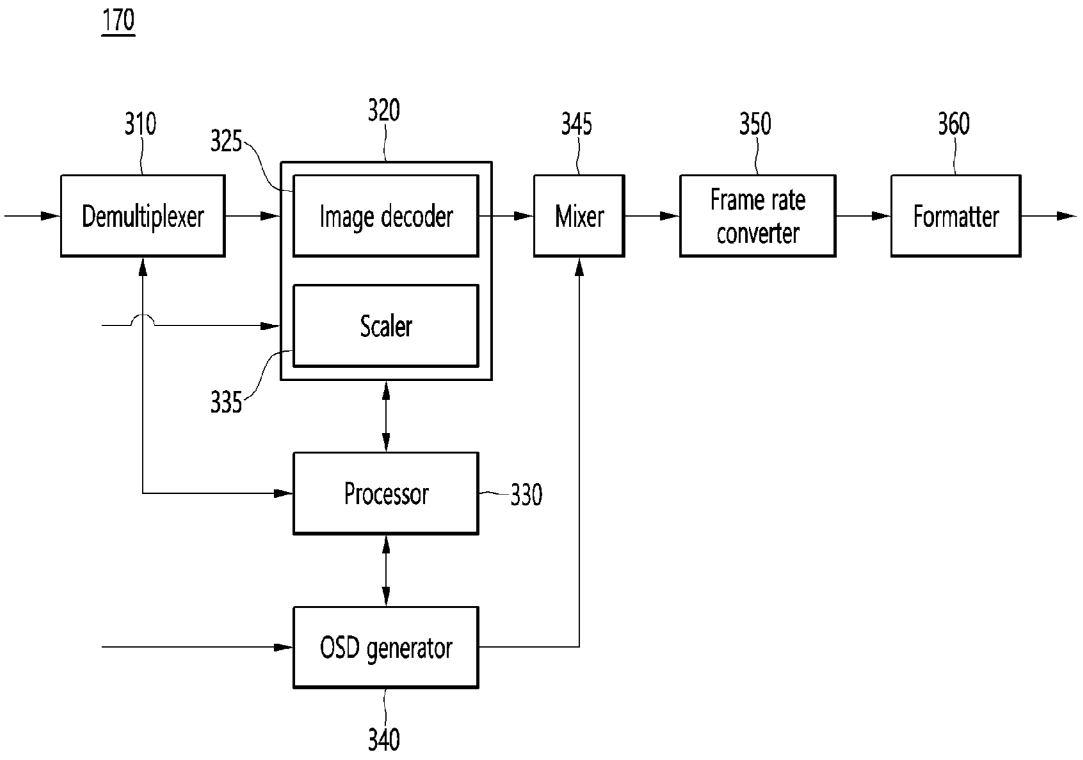
FIG. 3 is an example of a block diagram of the inside of a controller in FIG. 2.

FIG. 3 is an example of a block diagram of the inside of a controller in FIG. 2.

For description with reference to the drawings, the controller 170 according to an embodiment of the present invention includes a demultiplexer 310, an image processor 320, a processor 330, an OSD generator 340, a mixer 345, a frame rate converter 350, and a formatter 360. In addition, an audio processor (not illustrated) and a data processor (not illustrated) are further included.

The demultiplexer 310 demultiplexes a stream input. For example, in a case where an MPEG-2 TS is input, the MPEG-2 TS is demultiplexed into an image signal, an audio signal, and a data signal. At this point, a stream signal input into the demultiplexer 310 is a stream signal output from the tuner 110, the demodulator 120, or the external device interface 135.

The image processor 320 performs image processing of the image signal that results from the demultiplexing. To do this, the image processor 320 includes an image decoder 325 or a scaler 335.

The image decoder 325 decodes the image signal that results from the demultiplexing. The scaler 335 performs scaling in such a manner that a resolution of an image signal which results from the decoding is such that the image signal is possibly output to the display 180.

Examples of the image decoder 325 possibly include decoders in compliance with various specifications. For example, the examples of the image decoder 325 include a decoder for MPEG-2, a decoder for H.264, a 3D image decoder for a color image and a depth image, a decoder for a multi-point image, and so on.

The processor 330 controls an overall operation within the display device 100 or within the controller 170. For example, the processor 330 controls the tuner 110 in such a manner that the tuner 110 performs the selection of (tuning to) the RF broadcast that corresponds to the channel selected by the user or the channel already stored.

In addition, the processor 330 controls the display device 100 using the user command input through the user input interface 150, or the internal program.

In addition, the processor 330 performs control of transfer of data to and from the network interface 133 or the external device interface 135.

In addition, the processor 330 controls operation of each of the demultiplexer 310, the image processor 320, the OSD generator 340, and so on within the controller 170.

The OSD generator 340 generates an OSD signal, according to the user input or by itself. For example, based on the user input signal, a signal is generated for displaying various pieces of information in a graphic or text format on a screen of the display 180. The OSD signal generated includes various pieces of data for a user interface screen of the display device 100, various menu screens, a widget, an icon, and so on. In addition, the OSD generated signal includes a 2D object or a 3D object.

In addition, based on a pointing signal input from the remote controller 200, the OSD generator 340 generates a pointer possibly displayed on the display. Particularly, the pointer is generated in a pointing signal processor, and an OSD generator 340 includes the pointing signal processor (not illustrated). Of course, it is also possible that instead of being providing within the OSD generator 340, the pointing signal processor (not illustrated) is provided separately.

The mixer 345 mixes the OSD signal generated in the OSD generator 340, and the image signal that results from the image processing and the decoding in the image processor 320. An image signal that results from the mixing is provided to the frame rate converter 350.

The frame rate converter (FRC) 350 converts a frame rate of an image input. On the other hand, it is also possible that the frame rate converter 350 outputs the image, as is, without separately converting the frame rate thereof.

On the other hand, the formatter 360 converts a format of the image signal input, into a format for an image signal to be displayed on the display, and outputs an image that results from the conversion of the format thereof.

The formatter 360 changes the format of the image signal. For example, a format of a 3D image signal is changed to any one of the following various 3D formats: a side-by-side format, a top and down format, a frame sequential format, an interlaced format, and a checker box format.

On the other hand, the audio processor (not illustrated) within the controller 170 performs audio processing of an audio signal that results from the demultiplexing. To do this, the audio processor (not illustrated) includes various decoders.

In addition, the audio processor (not illustrated) within the controller 170 performs processing for base, treble, volume adjustment and so on.

The data processor (not illustrated) within the controller 170 performs data processing of a data signal that results from the demultiplexing. For example, in a case where a data signal that results from the demultiplexing is a data signal the results from coding, the data signal is decoded. The data signal that results from the coding is an electronic program guide that includes pieces of broadcast information, such as a starting time and an ending time for a broadcast program that will be telecast in each channel.

On the other hand, a block diagram of the controller 170 illustrated in FIG. 3 is a block diagram for an embodiment of the present invention. Each constituent element in the block diagram is subject to integration, addition, or omission according to specifications of the image display controller 170 actually realized.

Particularly, the frame rate converter 350 and the formatter 360 may be provided separately independently of each other or may be separately provided as one module, without being provided within the controller 170.

Figure 4:
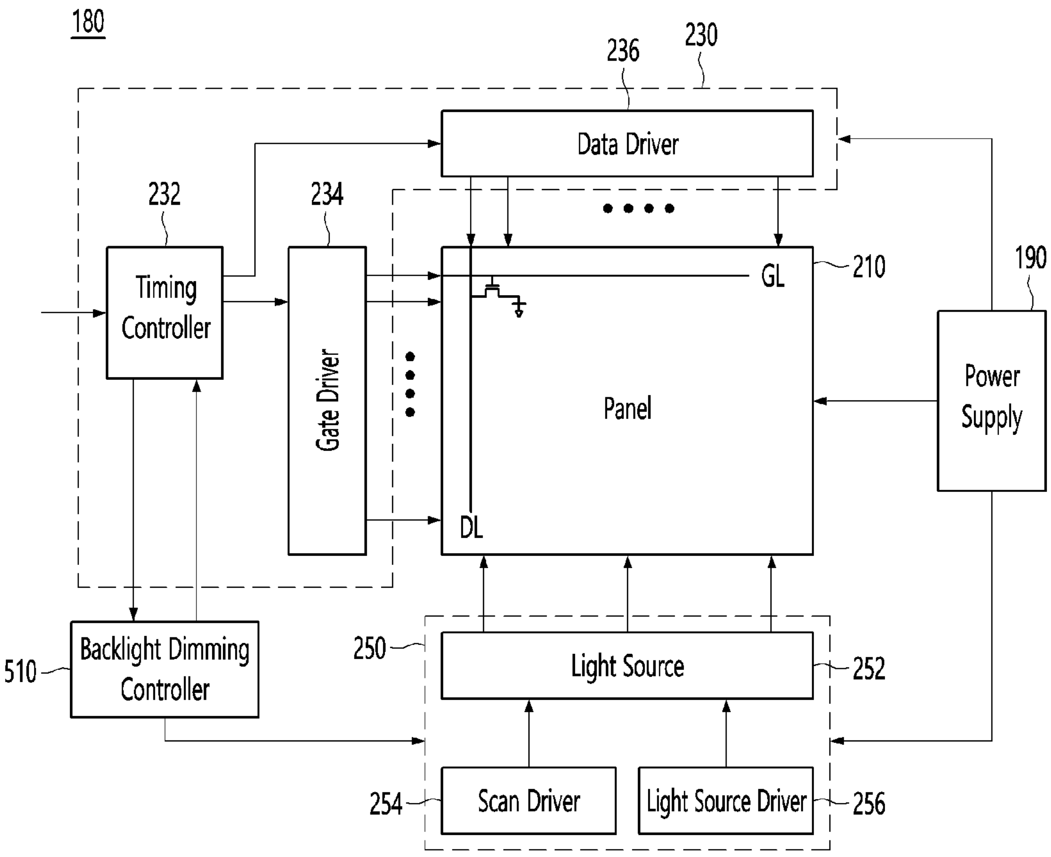
FIG. 4 is a block diagram of the inside of the power supply and the display of FIG. 2.

FIG. 4 is a block diagram of the inside of the power supply and the display of FIG. 2.

Referring to the figure, the display 180 based on a liquid crystal panel (LCD panel) may include a liquid crystal display panel 210, a driving circuit 230, a backlight unit 250, and a backlight dimming controller 510.

The liquid crystal display panel 210, in order to display an image, includes: a first substrate in which a plurality of gate lines GL and data lines DL are disposed across each other in a matrix shape, thin film transistors and pixel electrodes connected with the thin film transistors are formed at the intersections; a second substrate having common electrodes; and a liquid crystal layer formed between the first substrate and the second substrate.

The driving circuit 230 drives the liquid crystal display panel 210 in response to a control signal and a data signal that are supplied from the controller 170 of FIG. 2. To this end, the driving circuit 230 includes a timing controller 232, a gate driver 234, and a data driver 236.

The timing controller 232 receives a control signal, R, G, B data signal, a vertical synchronization signal Vsync etc. from the controller 170, controls the gate driver 234 and the data driver 236 in response to the control signal, and rearranges and provides the R, G, B data signal to the data driver 236.

By control of the gate driver 234, the data driver 236, and the timing controller 232, a scan signal and an image signal are supplied to the liquid crystal display panel 210 through a gate line GL and a data line DL.

The backlight unit 250 supplies light to the liquid crystal display panel 210. To this end, the backlight unit 250 may include a plurality of light sources 252, a scan driver 254 that controlling scanning driving of the light sources 252, and a light source driver 256 that turns on/off the light sources 252.

A predetermined image is displayed using light emitted from the backlight unit 250 with the light transmittance of the liquid crystal layer adjusted by an electric field generated between the pixel electrode and the common electrode of the liquid crystal display panel 210.

The power supply 190 can supply a common electrode voltage Vcom to the liquid crystal display panel 210 and a gamma voltage to the data driver 236. Further, the power supply 190 can supply driving power for driving the light sources 252 to the backlight unit 250.

Meanwhile, the backlight unit 250 can be divided and driven into a plurality of blocks. The controller 170 can control the display 180 to perform local dimming by setting a dimming value for each block. In detail, the timing controller 232 can output input image data RGB to the backlight dimming controller 510 and the backlight dimming controller 510 can calculate a dimming value for each of a plurality of blocks on the basis of the input image data RGB received from the timing controller 232.

Figure 5:
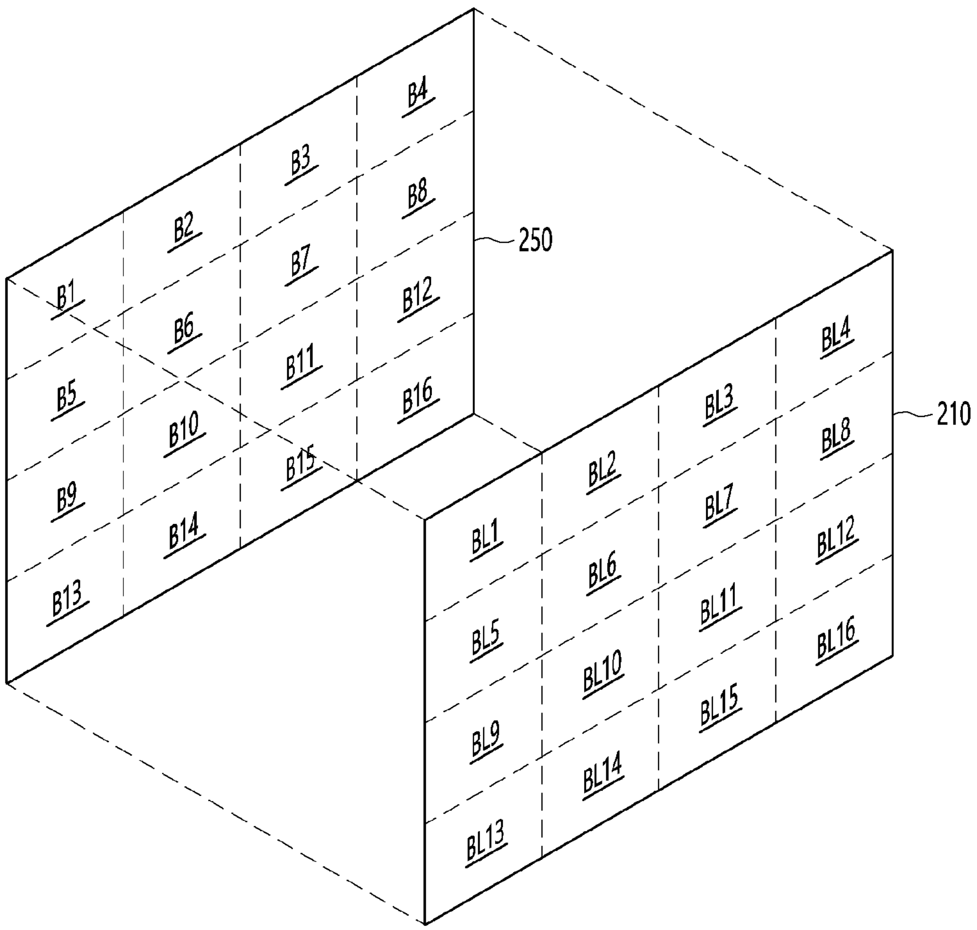
FIG. 5 is an example showing arrangement of a liquid crystal display panel and light sources in a direct-type backlight unit.

FIG. 5 is an example showing arrangement of a liquid crystal display panel and light sources in a direct-type backlight unit.

The liquid crystal display panel 210 may be divided into a plurality of virtual blocks, as shown in FIG. 5. Although the liquid crystal display panel 210 is equally divided into sixteen blocks BL1 to BL16 in FIG. 5, it should be noted that the liquid crystal display panel 210 is not limited thereto. Each of the blocks may include a plurality of pixels.

The backlight unit 250 may be implemented into any one of an edge type and direct type.

The edge-type backlight unit 250 has a structure in which a plurality of optical sheets and a light guide plate are stacked under the liquid crystal display panel 210 and a plurality of light sources is disposed on the sides of the light guide plate.

The direct-type backlight unit 250 has a structure in which a plurality of optical sheets and a diffuser plate are stacked under the liquid crystal display panel 210 and a plurality of light sources is disposed under the diffuser plate.

When the backlight unit 250 is a direct-type backlight unit, it is divided to correspond one to one to the blocks BL1 to BL16 of the liquid crystal display panel 210, as shown in FIG. 5. In this case, the brightness of the light traveling into the first block BL2 of the light source array can be adjusted using the light sources 252 included in the first block BL1 of the backlight unit 250 disposed at a position corresponding to the first block BL1 of the liquid crystal display panel 210.

The light sources 252 may be point light sources such as a Light Emitting Diode (LED). The light sources 252 are turned on and off in response to light source driving signals LDS from the light source driver 256. The light sources 252 can be adjusted in intensity of light in accordance with the amplitudes of the light source driving signals LDS and can be adjusted in turning-on time in accordance with the pulse width. The brightness of light that is outputted from the light sources 252 may be adjusted in accordance with the light source driving signal LDS.

The light source driver 256 can generate and output light source driving signals LDS to the light sources 252 on the basis of the dimming values of the blocks inputted from the backlight dimming controller 510. The dimming values of the blocks, which are values for performing local dimming, may be the brightness of the light that is outputted from the light sources 252.

Figure 6:
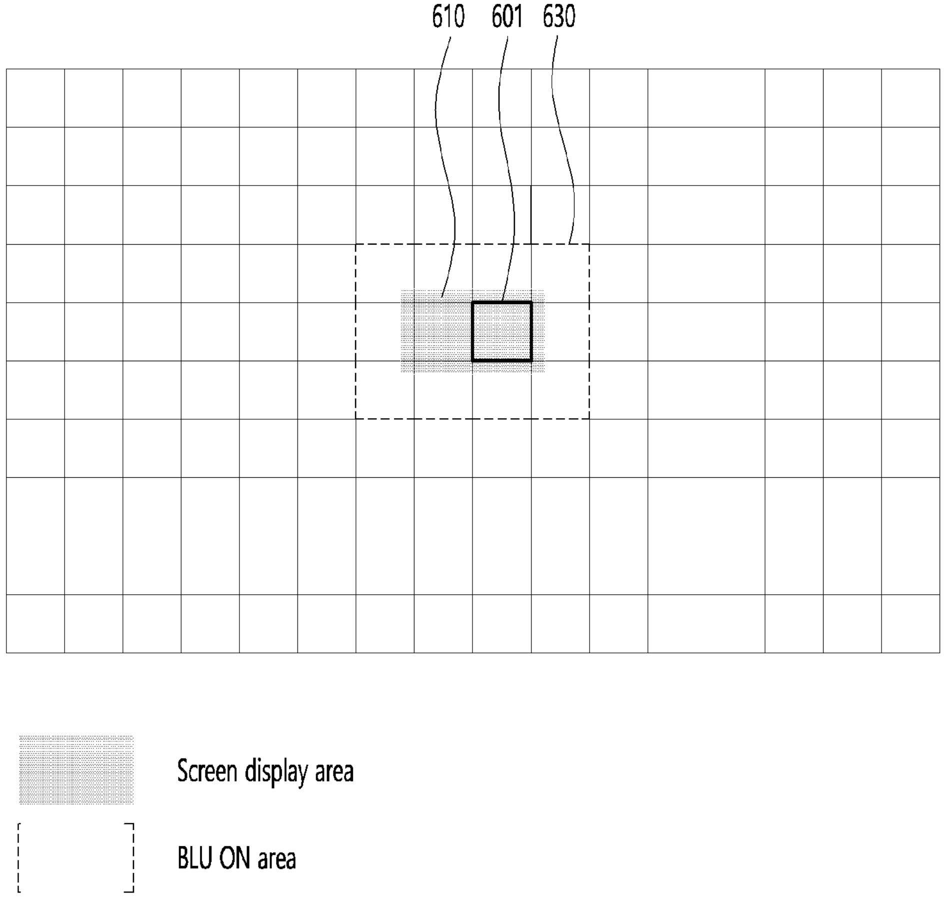
FIG. 6 is a diagram showing a case in which each of a plurality of unit blocks corresponding to a screen has the same size according to the prior art.

FIG. 6 is a diagram showing a case in which each of a plurality of unit blocks corresponding to a screen has the same size according to the prior art.

The brightness of each of the plurality of unit blocks 601 may be individually controlled through the backlight unit 250.

The screen display area 610 is an area where an image is output, and the backlight unit on area 630 is an area where the backlight unit 250 provides light to output an image of the screen display area 610.

As in the case of FIG. 6, when the size of the unit blocks is the same, the backlight unit on area 630 becomes larger than the screen display area 610, and light is provided to more unit blocks (12 unit blocks) than necessary. Accordingly, power consumption is wasted, and the contrast ratio of the peripheral area of the screen display area 610 decreases.

Figure 7:
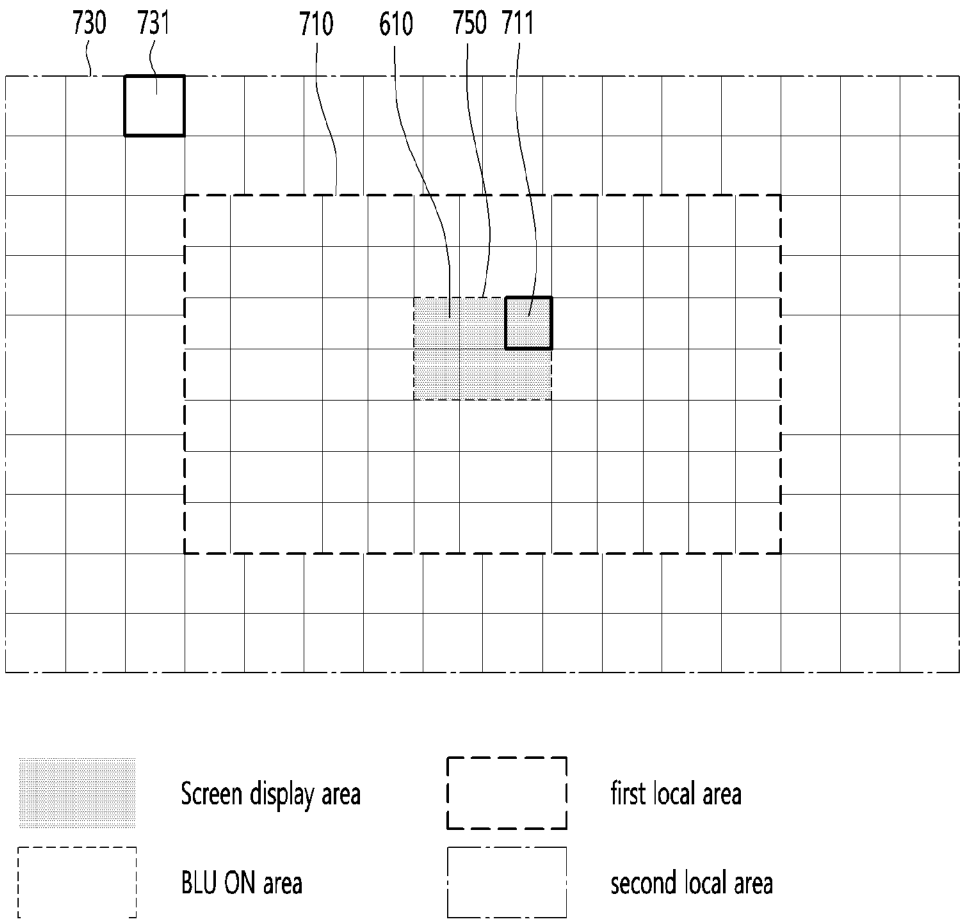
FIGS. 7 and 8 are diagrams illustrating cases in which unit blocks constituting each of a plurality of local areas of a screen have different sizes according to an embodiment of the present disclosure.
Figure 8:
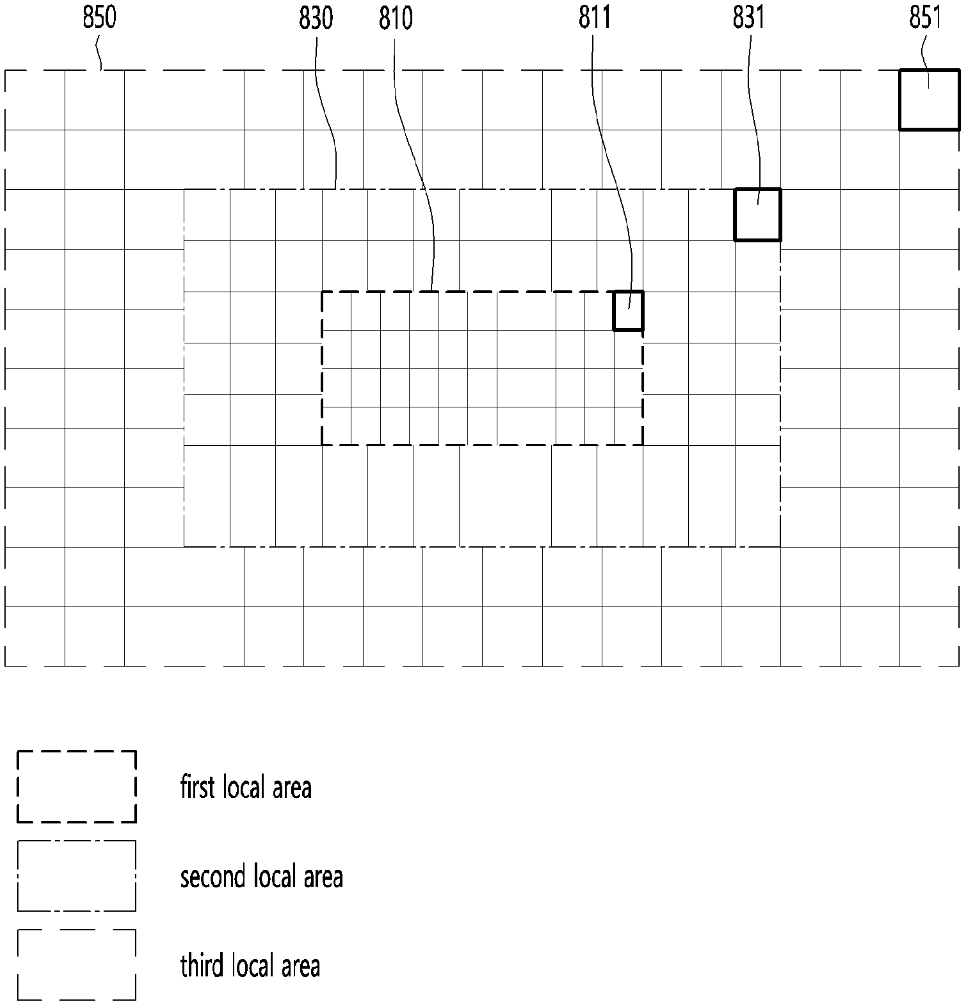

FIGS. 7 and 8 are diagrams illustrating cases in which unit blocks constituting each of a plurality of local areas of a screen have different sizes according to an embodiment of the present disclosure.

Hereinafter, the unit block is a block corresponding to the unit area of the display panel 210 and may be a block that supplies light to the unit area of the display panel 210.

In particular, FIG. 7 is a diagram illustrating a case where the screen is divided into two local areas, and FIG. 8 is a diagram explaining a case where the screen is divided into three local areas.

Referring to FIG. 7, the entire screen area may be divided into a first local area 710 and a second local area 730.

The first local area 710 may include a plurality of first unit blocks. Each of the plurality of first unit blocks may have the same size.

The second local area 730 may include a plurality of second unit blocks. Each of the plurality of second unit blocks may have the same size.

The first local area 710 may be located in the center of the screen, and the second local area 730 may be located on the outside of the screen. That is, of the entire area, an outer area other than the first local area 710 may be the second local area 730.

The second local area 730 may be positioned to surround the first local area 710.

The first local area 710 may be an important area that is mainly perceived by the viewer, and the second local area 730 may be an unimportant area that the viewer is less aware of.

The size of the first unit block 711 may be smaller than the size of the second unit block 731. The size of the second unit block 731 may be the same as the size of the unit block 601 of FIG. 6.

In FIG. 7, the screen display area 610 and the backlight unit on area 750 may be the same.

As the size of the first unit block 711 constituting the first local area 710 becomes smaller than the size of the unit block 601 of FIG. 6, the size of the backlight unit on area 750 (6 unit blocks) also may be smaller.

That is, according to the embodiment of FIG. 7, the number of unit blocks that must be turned on to supply light to the screen display area 610 is reduced from 12 to 6 compared to the prior art of FIG. 6.

Accordingly, waste of power consumption is prevented, and as the size of the screen display area 610 and the backlight unit on area 750 become the same, the resolution and contrast ratio of the peripheral area of the screen display area 610 can also be improved.

Referring to FIG. 8, the entire screen area may be divided into a fourth local area 810, a fifth local area 830, and a sixth local area 850.

The fourth local area 810 may include a plurality of fourth unit blocks, the fifth local area 830 may include a plurality of fifth unit blocks, and the sixth local area 850 may include a plurality of sixth unit blocks.

Each of the plurality of fourth unit blocks may have the same size.

Each of the plurality of fifth unit blocks may have the same size.

Each of the plurality of sixth unit blocks may have the same size.

The fourth local area 810 is located in the center of the screen, the fifth local area 830 surrounds the fourth local area 810, and the sixth local area 850 surrounds the fifth local area 830.

The size of the fourth unit block 811 may be smaller than the size of the fifth unit block 831.

The size of the fifth unit block 831 may be smaller than the size of the sixth unit block 851.

In other words, the size of the unit block may become larger as it moves from the center of the screen to the outward.

Figure 9:
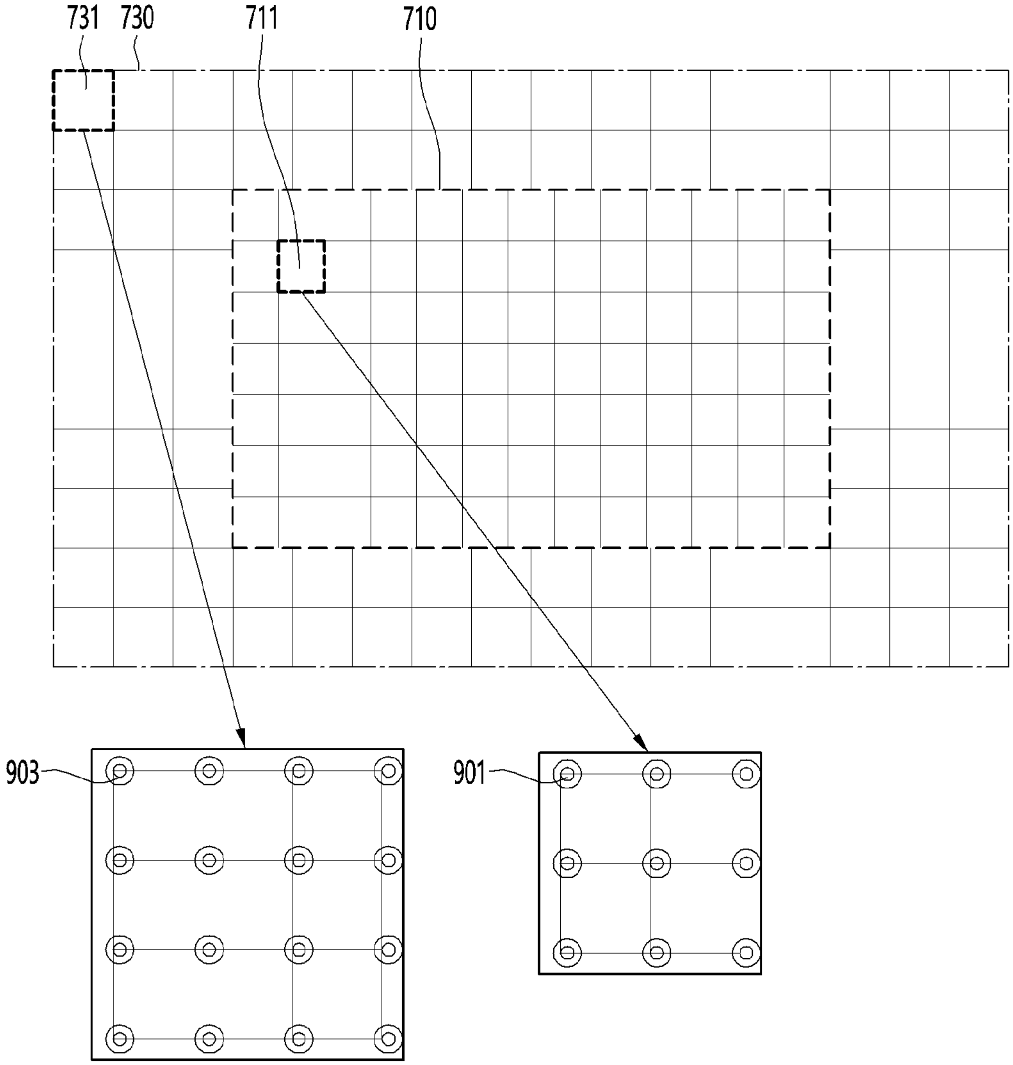
FIG. 9 is a diagram illustrating the configuration of a unit block of a screen with a dual structure according to an embodiment of the present disclosure.

FIG. 9 is a diagram illustrating the configuration of a unit block of a screen with a dual structure according to an embodiment of the present disclosure.

Referring to FIG. 9, the screen may have a dual structure like the embodiment of FIG. 7.

That is, the entire screen area may include the first local area 710 and the second local area 730, which is an area other than the first local area 710.

Each of the plurality of first unit blocks 711 included in the first local area 710 may include nine light emitting diodes (LEDs).

The first unit block 711 may include nine LEDs 901 arranged at regular intervals. The spacing between adjacent LEDs arranged in the horizontal direction of the first unit block 711 may be equal to each other, and the spacing between adjacent LEDs arranged in the vertical direction of the first unit block 711 may be equal to each other.

Each of the plurality of second unit blocks 731 included in the second local area 730 may include 16 LEDs 903.

The spacing between adjacent LEDs arranged in the horizontal direction of the second unit block 731 is the same, and the spacing between adjacent LEDs arranged in the vertical direction of the second unit block 731 is the same.

Additionally, the spacing between two horizontally or vertically adjacent LEDs of the first unit block 711 may be the same as the spacing between horizontally or vertically adjacent LEDs of the second unit block 731.

As such, in the case of the dual structure according to the embodiment of FIG. 9, the spacing between adjacent LEDs of the first unit block 711 is the same as the spacing between adjacent LEDs of the second unit block 731, but the number of LEDs included in the first unit block 711 may be smaller than the number of LEDs included in the second unit block 731.

Accordingly, compared to a case where the entire screen area is composed of unit blocks of the same size, the number of LEDs can be reduced and power consumption can be saved.

In addition, by designing the size of the unit block in the central area perceived by the viewer to be small, not only does resolution increase, but the contrast ratio in the peripheral area of the displayed image is improved, thereby improving picture quality.

Figure 10A:
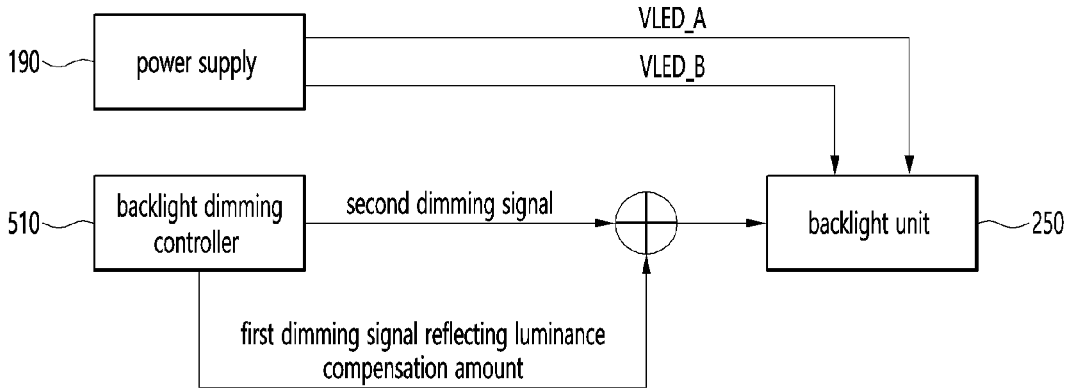
FIGS. 10A and 10B are diagrams for explaining the driving voltage and dimming signal provided to each local area according to the dual structure of FIG. 9.
Figure 10B:
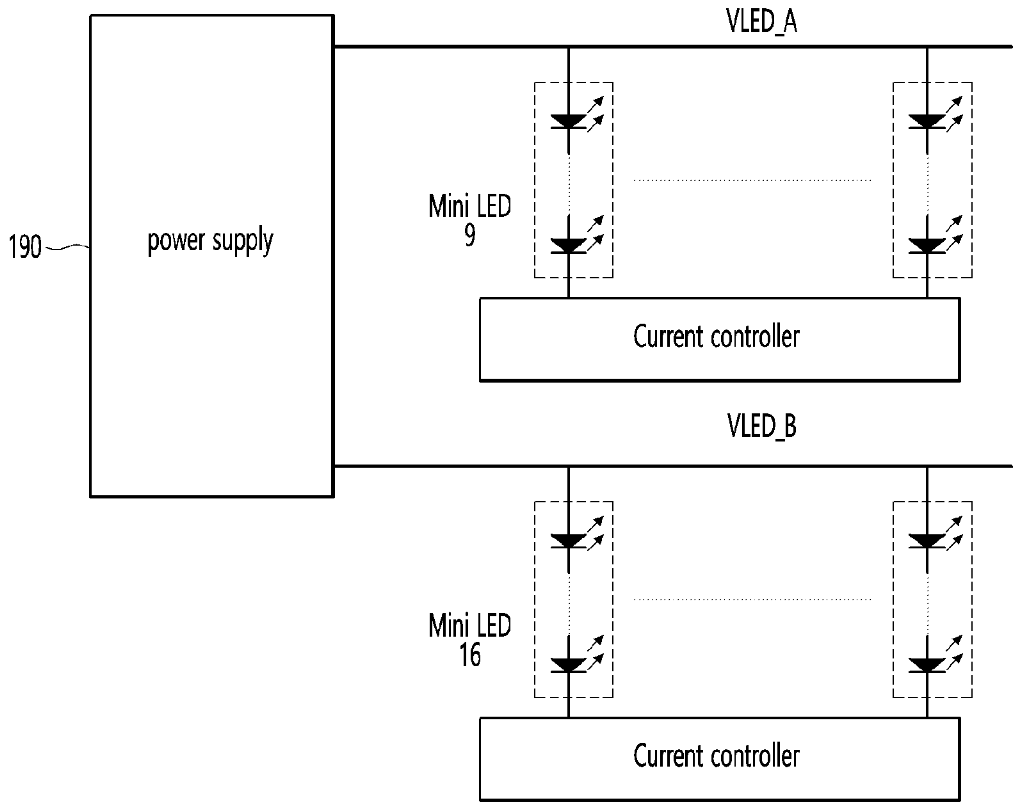

FIGS. 10A and 10B are diagrams for explaining the driving voltage and dimming signal provided to each local area according to the dual structure of FIG. 9.

Referring to FIG. 10A, the power supply 190 may supply a first driving voltage (VLED_A) to the first unit block 711 and a second driving voltage (VLED_B) to the second unit block 731.

The magnitude of the second driving voltage (VLED_B) may be larger than the magnitude of the first driving voltage (VLED_A).

As shown in FIG. 9, the first unit block 711 includes 9 LEDs, and the second unit block 731 includes 16 LEDs, so the magnitude of the driving voltage supplied to each unit block may vary.

For example, referring to FIG. 10B, when the voltage supplied to one LED is 5.7V, the magnitude of the first driving voltage (VLED_A) supplied to the first unit block 711 is 51.3V (9×5.7), and the magnitude of the second driving voltage (VLED_B) supplied to the second unit block 731 is 91.2V (16×5.7).

In this way, the supplied driving voltage may also be supplied differently due to the size difference between the first unit block 711 and the second unit block 731.

Meanwhile, since the number of LEDs included in the first unit block 711 is smaller than the number of LEDs included in the second unit block 731, brightness is reduced and luminance compensation is required.

The backlight dimming controller 510 may calculate the amount of luminance reduction due to a decrease in the number of LEDs in the first unit block 711.

The backlight dimming controller 510 may calculate a luminance compensation amount corresponding to the reduced number of LEDs in the first unit block 711. For example, as shown in FIG. 9, when the number of LEDs in the first unit block 711 is 9 and the number of LEDs in the second unit block 731 is 16, the backlight dimming controller 510 may calculate luminance compensation amount corresponding 7 LEDs.

The backlight dimming controller 510 may previously store a unit luminance compensation amount corresponding to one LED. The memory (not shown) or storage 140 included in the backlight dimming controller 510 or provided separately may store in advance a unit luminance compensation amount corresponding to one LED.

The backlight dimming controller 510 can calculate the luminance compensation amount corresponding to the seven LEDs using the stored unit luminance compensation amount.

The backlight dimming controller 510 may previously store the luminance compensation amount corresponding to each unit block in memory. The memory may be included in the backlight dimming controller 510 or may be provided separately.

The backlight dimming controller 510 may read the luminance compensation amount of each unit block from memory and transmit a dimming signal reflecting the read luminance compensation amount to the backlight unit 500. Accordingly, the luminance of each unit block can be compensated.

For example, the backlight dimming controller 510 may read the luminance compensation amount of the first unit block 711 from memory and transmit a first dimming signal reflecting the read luminance compensation amount to the backlight unit 500.

In another embodiment, the backlight dimming controller 510 may calculate a first luminance amount corresponding to the size of the first unit block 711 and calculate a second luminance amount corresponding to the size of the second unit block 731.

The backlight dimming controller 510 may obtain a value obtained by subtracting the first luminance amount from the second luminance amount as the luminance compensation amount.

The backlight dimming controller 510 may adjust the dimming curve of each of the plurality of first unit blocks included in the first local area 710 according to the calculated luminance compensation amount.

The dimming curve may be a curve representing the characteristic of the dimming value of the unit block. The horizontal axis of the dimming curve may be a grayscale value from 0 to 255, and the vertical axis may be a dimming value from 0% to 100%.

The backlight dimming controller 510 may generate a first dimming signal reflecting the calculated luminance compensation amount and transmit the generated first dimming signal to the backlight unit 250.

The first dimming signal may include a dimming value for controlling each of the plurality of first unit blocks.

The backlight dimming controller 510 may adjust the dimming curve of each of the plurality of first unit blocks to reflect the luminance compensation amount (increase amount of luminance). The backlight dimming controller 510 may adjust the dimming curve so that the dimming value increases compared to the same gray level value.

The backlight dimming controller 510 generates a second dimming signal and transmits the second dimming signal to the backlight unit 510.

The second dimming signal may include a dimming value for controlling each of the plurality of second unit blocks.

Figure 11:
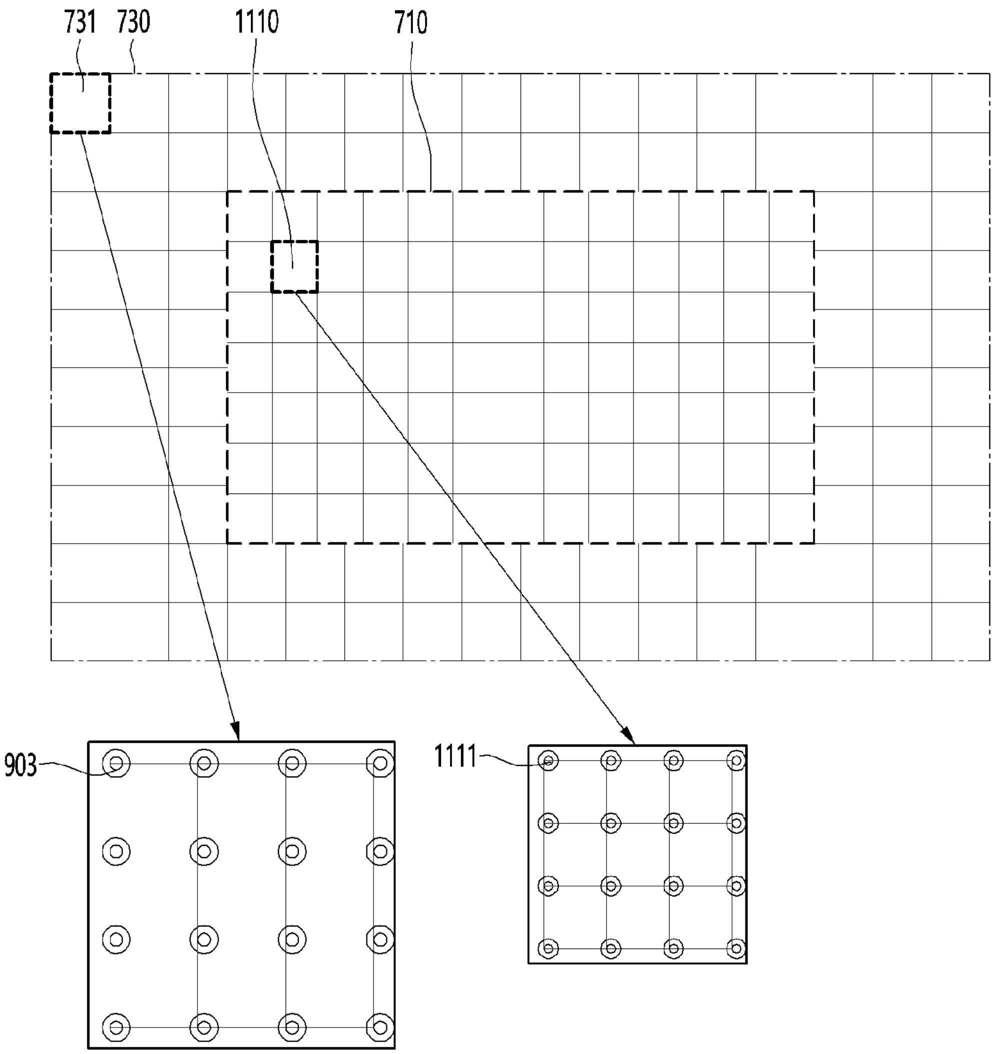
FIG. 11 is a diagram illustrating the configuration of a unit block of a screen with a dual structure according to another embodiment of the present disclosure.

FIG. 11 is a diagram illustrating the configuration of a unit block of a screen with a dual structure according to another embodiment of the present disclosure.

Referring to FIG. 11, the screen may have a dual structure like the embodiment of FIG. 7.

That is, the entire screen area may include the first local area 710 and the second local area 730, which is an area other than the first local area 710.

Each of the plurality of first unit blocks 1110 included in the first local area 710 may include 16 LEDs 1111.

Each of the plurality of second unit blocks 731 included in the second local area 730 may include 16 LEDs 903.

The number of LEDs included in the first unit block 1110 may be the same as the number of LEDs included in the second unit block 731.

The spacing between two adjacent LEDs included in the first unit block 1110 in the horizontal or vertical direction is the same.

The spacing between two adjacent LEDs included in the second unit block 731 in the horizontal or vertical direction is the same.

The spacing between two horizontally or vertically adjacent LEDs of the first unit block 1110 may be smaller than the spacing between two horizontally or vertically adjacent LEDs of the second unit block 731.

That is, the distance between two adjacent LEDs is reduced while maintaining the number of LEDs in the first unit block 1110, so that the size of the block can be reduced.

As such, in the case of the dual structure according to the embodiment of FIG. 11, the number of LEDs included in the first unit block 1110 is the same as the number of LEDs included in the second unit block 731, but the number of LEDs included in the first unit block 1110 may be smaller than the spacing between adjacent LEDs of the second unit block 731.

In this way, by designing the size of the unit block in the central area perceived by the viewer to be small, not only can resolution be increased, but the contrast ratio of the peripheral area of the displayed image can be improved, thereby improving picture quality.

Figure 12A:
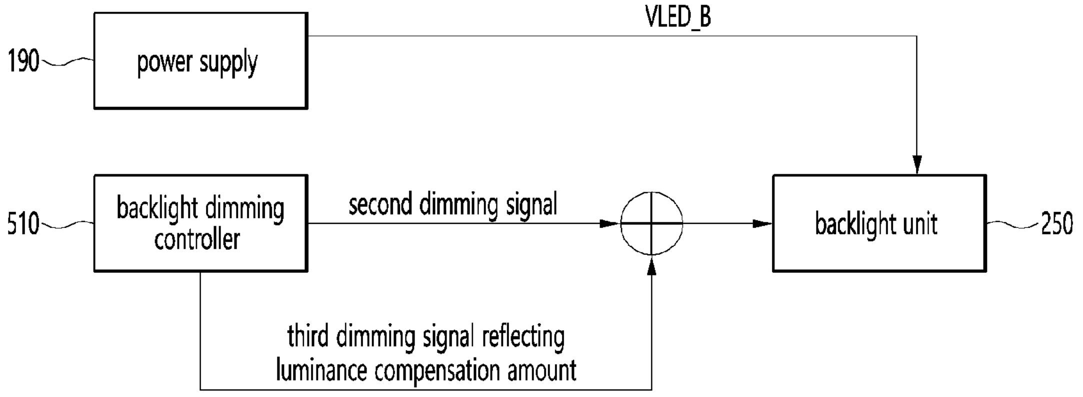
FIGS. 12A and 12B are diagrams for explaining the driving voltage and dimming signal provided to each local area according to the dual structure of FIG. 11.
Figure 12B:
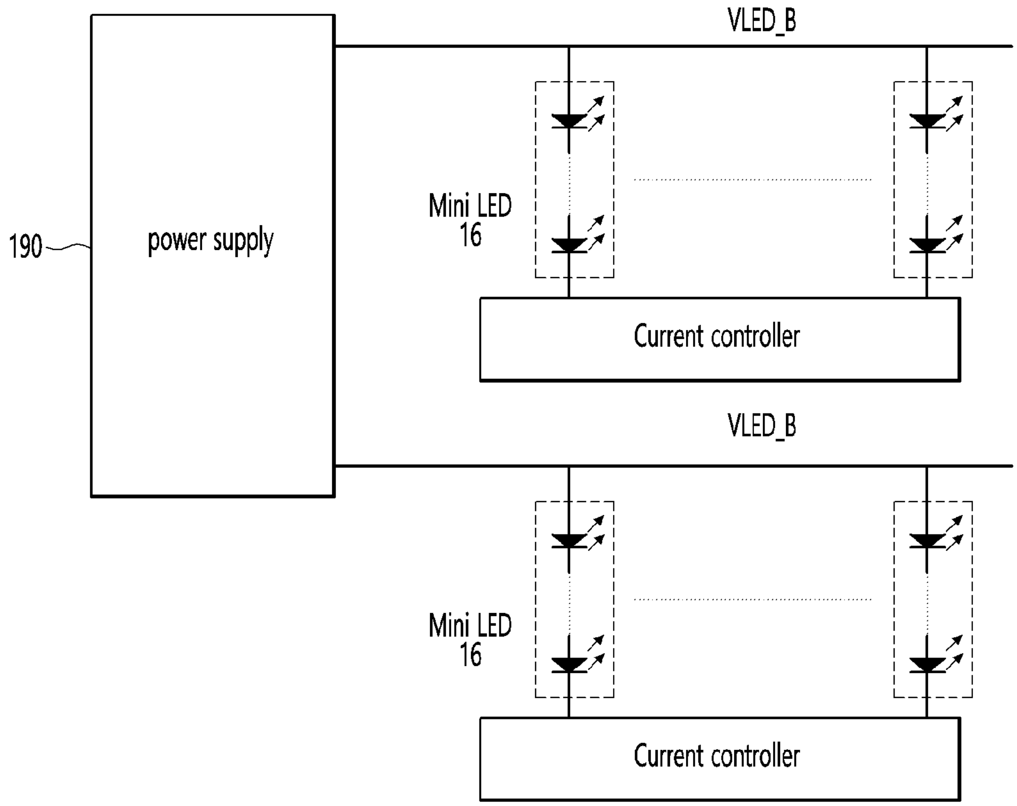

FIGS. 12A and 12B are diagrams for explaining the driving voltage and dimming signal provided to each local area according to the dual structure of FIG. 11.

Referring to FIG. 12A, the power supply 190 may supply a second driving voltage (VLED_B) to the first unit block 1110 and a second driving voltage (VLED_B) to the second unit block 731.

That is, since the number of LEDs included in each of the first unit block 1110 and the second unit block 731 is the same, the power supply 190 may supply the same driving voltage to each of the first unit block 1110 and the second unit block 731.

For example, referring to FIG. 12B, when the voltage supplied to one LED is 5.7V, the magnitude of the first driving voltage (VLED_A) supplied to the first unit block 1110 is 91.2V (16×5.7), and the magnitude of the second driving voltage (VLED_B) supplied to the second unit block 731 is 91.2V (16×5.7).

In this way, even if there is a size difference between the first unit block 1110 and the second unit block 731, the supplied driving voltage may be the same.

Meanwhile, even if the number of LEDs included in the first unit block 1110 is the same as the number of LEDs included in the second unit block 731, the size of the first unit block 1110 is smaller than the size of the second unit block 731. Since the luminance increases due to the density of LEDs in the first unit block 1110, luminance compensation is necessary.

The backlight dimming controller 510 may calculate a luminance compensation amount to be compensated due to an increase in the number of LEDs of the first unit block 1110 compared to the same size as the second unit block 731.

The backlight dimming controller 510 may calculate a third luminance amount corresponding to the size of the first unit block 1110 and calculate a second luminance amount corresponding to the size of the second unit block 731.

The backlight dimming controller 510 may obtain a value obtained by subtracting the second luminance amount from the third luminance amount as the luminance compensation amount.

The backlight dimming controller 510 may adjust the dimming curve of each of the plurality of first unit blocks included in the first local area 710 according to the calculated luminance compensation amount.

The dimming curve may be a curve representing the characteristics of the dimming value of the unit block. The horizontal axis of the dimming curve may be a grayscale value from 0 to 255, and the vertical axis may be a dimming value from 0% to 100%.

The backlight dimming controller 510 may generate a third dimming signal reflecting the calculated luminance compensation amount (reduction amount of luminance) and transmit the generated third dimming signal to the backlight unit 250.

The third dimming signal may include a dimming value for controlling each of the plurality of first unit blocks.

The backlight dimming controller 510 may adjust the dimming curve of each of the plurality of first unit blocks to reflect the luminance compensation amount. The backlight dimming controller 510 may adjust the dimming curve so that the dimming value increases compared to the same gray level value.

The backlight dimming controller 510 generates a second dimming signal and transmits the second dimming signal to the backlight unit 510.

The second dimming signal may include a dimming value for controlling each of the plurality of second unit blocks.

The backlight dimming controller 510 may previously store the luminance compensation amount corresponding to each unit block in memory. The memory may be included in the backlight dimming controller 510 or may be provided separately.

The backlight dimming controller 510 may read the luminance compensation amount of each unit block from memory and transmit a dimming signal reflecting the read luminance compensation amount to the backlight unit 500. Accordingly, the luminance of each unit block can be compensated.

Figure 13:
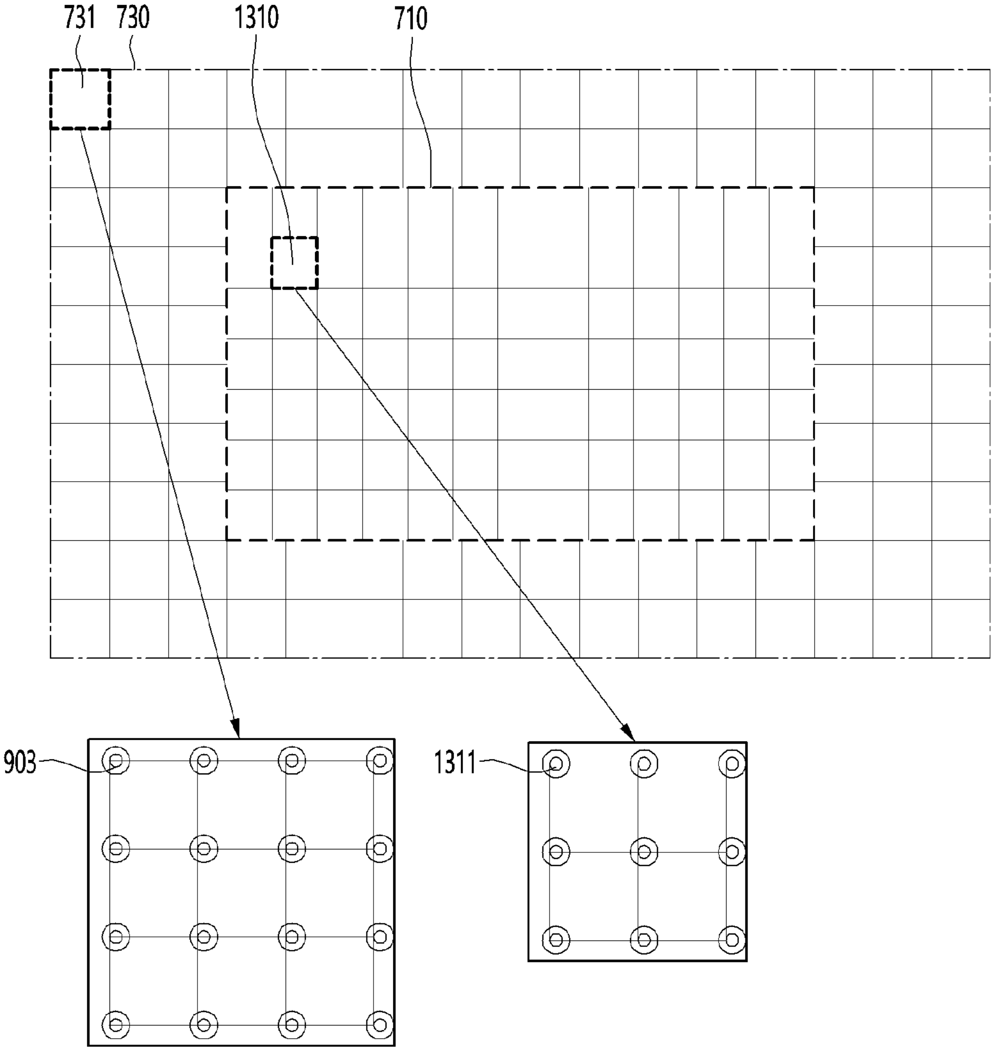
FIG. 13 is a diagram illustrating the configuration of a unit block of a screen with a dual structure according to another embodiment of the present disclosure.

FIG. 13 is a diagram illustrating the configuration of a unit block of a screen with a dual structure according to another embodiment of the present disclosure.

Referring to FIG. 13, the screen may have a dual structure like the embodiment of FIG. 7.

That is, the entire screen area may include the first local area 710 and the second local area 730, which is an area other than the first local area 710.

Each of the plurality of first unit blocks 1310 included in the first local area 710 may include nine LEDs 1311.

Each of the plurality of second unit blocks 731 included in the second local area 730 may include 16 LEDs 903.

The spacing between two adjacent LEDs included in the first unit block 1310 in the horizontal or vertical direction is the same.

The spacing between two horizontally or vertically adjacent LEDs included in the second unit block 731 is the same.

The spacing between two horizontally or vertically adjacent LEDs of the first unit block 1310 may be smaller than the spacing between two horizontally or vertically adjacent LEDs of the second unit block 731.

That is, the number of LEDs in the first unit block 1110 is also smaller than that in the second unit block 731, and by reducing the spacing between two adjacent LEDs, the block size can be implemented to be small.

As such, in the case of the dual structure according to the embodiment of FIG. 13, the number of LEDs included in the first unit block 1110 is smaller than the number of LEDs included in the second unit block 731, and the spacing between adjacent LEDs of the first unit block 1310 may be smaller than the spacing between adjacent LEDs of the second unit block 731.

Accordingly, compared to a case where the entire screen area is composed of unit blocks of the same size, the number of LEDs can be reduced and power consumption can be saved.

In addition, by designing the size of the unit block in the central area perceived by the viewer to be small, not only does resolution increase, but the contrast ratio in the peripheral area of the displayed image is improved, thereby improving picture quality.

Meanwhile, the type of LED 1311 included in the first unit block 1310 and the type of LED 903 included in the second unit block 731 may be different from each other.

The luminous efficiency of the LED 1311 included in the first unit block 1310 may be better than that of the LED 903 included in the second unit block 731.

Figure 14:
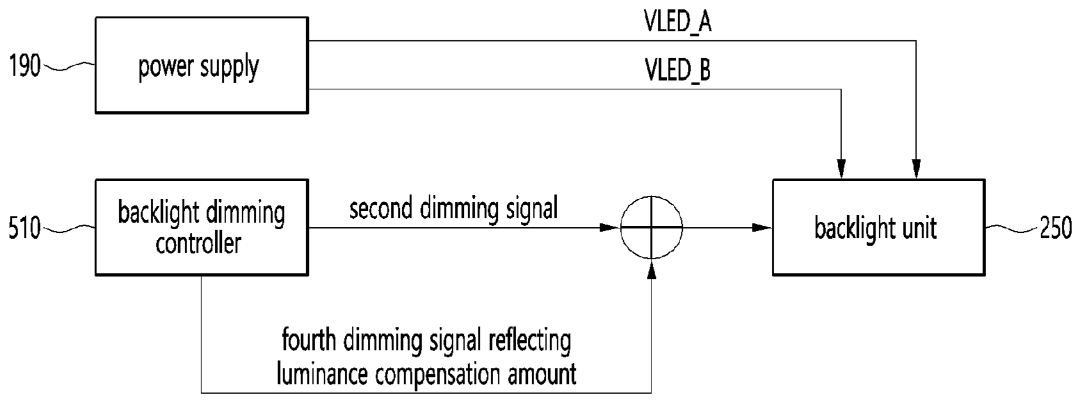
FIG. 14 is a diagram for explaining the driving voltage and dimming signal provided to each local area according to the dual structure of FIG. 13.

FIG. 14 is a diagram for explaining the driving voltage and dimming signal provided to each local area according to the dual structure of FIG. 13.

Referring to FIG. 14, the power supply 190 may supply a first driving voltage (VLED_A) to the first unit block 1310 and supply a second driving voltage (VLED_B) to the second unit block 731.

That is, since the number of LEDs included in the first unit block 1310 is the same the number of LEDs included in the second unit block 731, the power supply 190 may supply the same driving voltage to each of the first unit block 1310 and the second unit block 731.

The magnitude of the second driving voltage (VLED_B) may be larger than the magnitude of the first driving voltage (VLED_A).

For example, when the voltage supplied to one LED is 5.7V, the magnitude of the first driving voltage (VLED_A) supplied to the first unit block 1310 is 51.3V (9×5.7), and the size of the second unit block 1310 is 51.3V (9×5.7). The magnitude of the second driving voltage (VLED_B) supplied to (731) is 91.2V (16×5.7).

In this way, the supplied driving voltage may also be supplied differently due to the size difference between the first unit block 1330 and the second unit block 731.

Meanwhile, since the number of LEDs included in the first unit block 1310 is smaller than the number of LEDs included in the second unit block 731, brightness is reduced and luminance compensation is required.

In another embodiment, the backlight dimming controller 510 may calculate a fourth luminance amount corresponding to the size of the first unit block 1310 and calculate a second luminance amount corresponding to the size of the second unit block 731.

The backlight dimming controller 510 may obtain a value obtained by subtracting the fourth luminance amount from the second luminance amount as the luminance compensation amount.

The backlight dimming controller 510 may generate a fourth dimming signal reflecting the calculated luminance compensation amount and transmit the generated fourth dimming signal to the backlight unit 250.

The backlight dimming controller 510 may adjust the dimming curve of each of the plurality of first unit blocks included in the first local area 710 according to the calculated luminance compensation amount.

Figure 15:
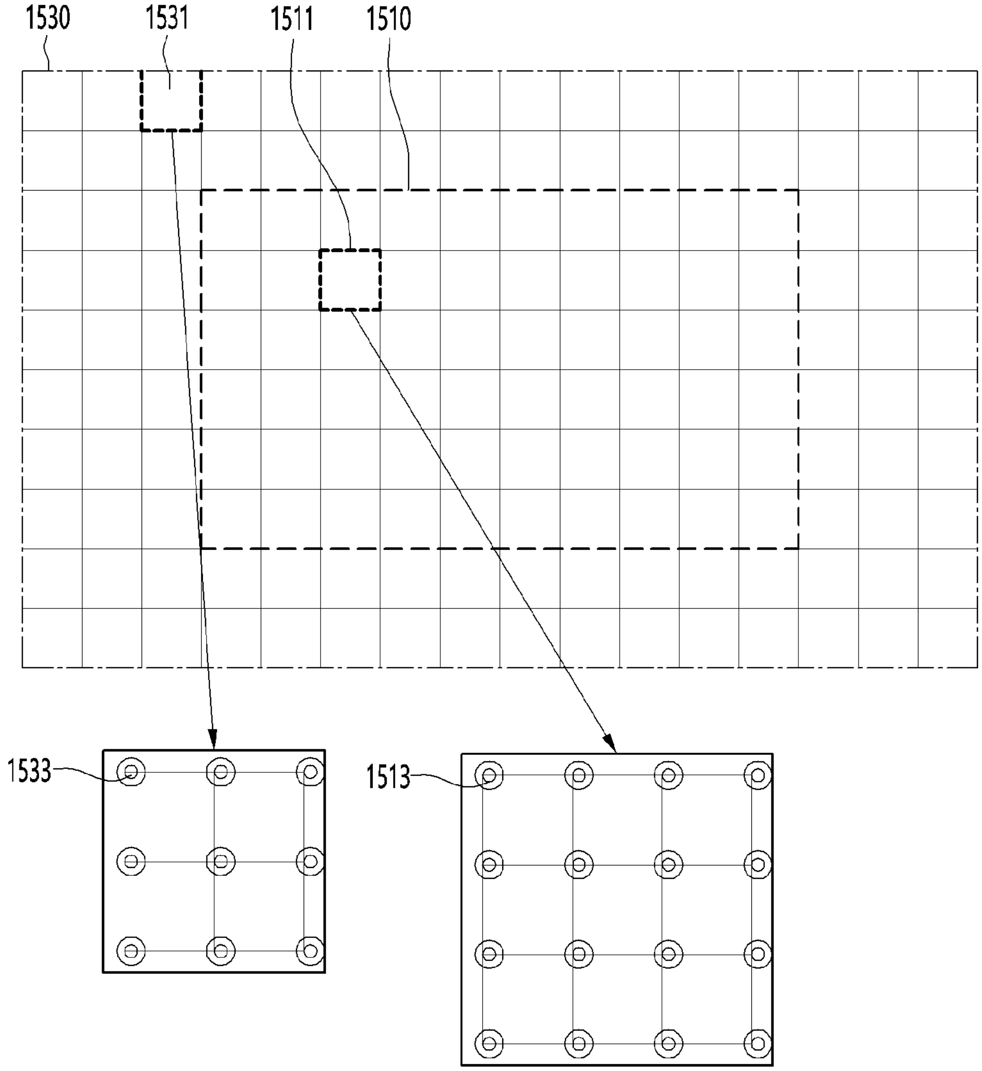
FIG. 15 is a diagram illustrating a screen with a dual structure according to another embodiment of the present disclosure.

FIG. 15 is a diagram illustrating a screen with a dual structure according to another embodiment of the present disclosure.

Referring to FIG. 15, the entire screen area may include a first local area 1510 and a second local area 1530 other than the first local area 1510.

The first local area 1510 may be the center area of the screen, and the second local area 1510 may be an outer area surrounding the first local area 1510.

The first local area 1510 may include a plurality of first unit blocks, and the second local area 1530 may include a plurality of second unit blocks.

The size of each of the plurality of first unit blocks 1511 and the size of each of the plurality of second unit blocks 1531 may be the same.

The number of LEDs 1513 included in each of the plurality of first unit blocks 1511 or the arrangement structure of the LEDs 1513 may be different from the number of LEDs 1533 included in each of the plurality of second unit blocks 1531 or the arrangement structure of LEDs 1513.

For example, the number of LEDs 1513 included in the first unit block 1511 may be 16, and the number of LEDs 1533 included in the second unit block 1531 may be 9. Accordingly, the spacing between LEDs included in the first unit block 1511 may be smaller than the spacing between LEDs included in the second unit block 1531.

In the embodiment according to FIG. 15, the number and arrangement structure of LEDs 1531 included in the first unit block 1511 may be different from the number and arrangement structure of LEDs 1533 included in the second unit block 1531.

Figure 16A:
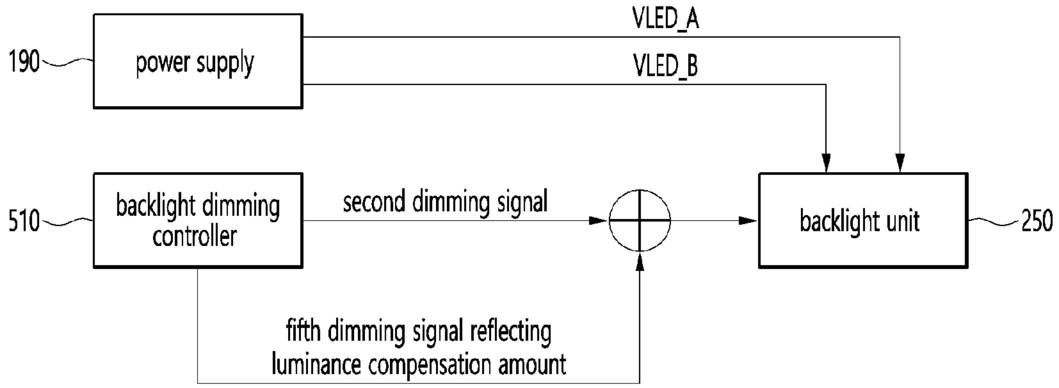
FIGS. 16A and 16B are diagrams for explaining driving voltages and dimming signals provided to each local area according to the embodiment of FIG. 15.
Figure 16B:
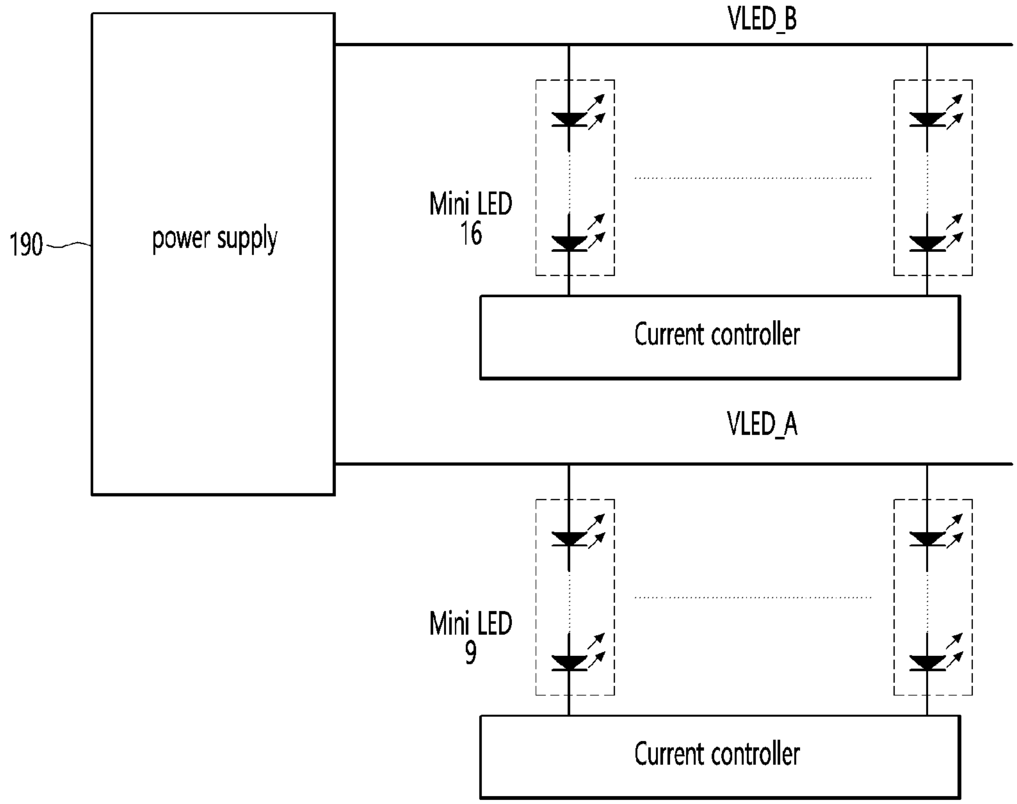

FIGS. 16A and 16B are diagrams for explaining driving voltages and dimming signals provided to each local area according to the embodiment of FIG. 15.

FIGS. 16A and 16B, the power supply 190 may supply a second driving voltage (VLED_B) to the first unit block 1511 and supply a first driving voltage (VLED_A) to the second unit block 1531. can be supplied.

The magnitude of the second driving voltage (VLED_B) may be larger than the magnitude of the first driving voltage (VLED_A).

As shown in FIG. 15, the first unit block 1511 includes 16 LEDs, and the second unit block 1531 includes 9 LEDs, so the magnitude of the driving voltage supplied to each unit block may vary.

For example, referring to FIG. 16B, when the voltage supplied to one LED is 5.7V, the magnitude of the first driving voltage (VLED_B) supplied to the first unit block 1511 is 91.2V (16×5.7), and the magnitude of the first driving voltage (VLED_A) supplied to the second unit block 1531 is 51.3V (9×5.7).

In this way, the supplied driving voltage may also be supplied differently due to the size difference between the first unit block 1511 and the second unit block 1531.

Meanwhile, since the number of LEDs included in the first unit block 1511 is greater than the number of LEDs included in the second unit block 1531, the luminance is increased and luminance compensation is required.

The backlight dimming controller 510 may calculate the luminance compensation amount due to the greater number of LEDs in the first unit block 1511 compared to the second unit block 1531.

The backlight dimming controller 510 may calculate a luminance compensation amount corresponding to the increased number of LEDs in the first unit block 1511.

For example, as shown in FIG. 15, when the number of LEDs in the first unit block 1511 is 16 and the number of LEDs in the second unit block 1531 is 9, the backlight dimming controller 510 may calculate luminance compensation amount corresponding 7 LEDS.

The backlight dimming controller 510 may previously store a unit luminance compensation amount corresponding to one LED. The memory (not shown) or storage 140 included in the backlight dimming controller 510 or provided separately may store in advance a unit luminance compensation amount corresponding to one LED.

The backlight dimming controller 510 can calculate the luminance compensation amount corresponding to the seven LEDs using the stored unit luminance compensation amount.

The backlight dimming controller 510 may previously store the luminance compensation amount corresponding to each unit block in memory. The memory may be included in the backlight dimming controller 510 or may be provided separately.

The backlight dimming controller 510 may read the luminance compensation amount of each unit block from memory and transmit a dimming signal reflecting the read luminance compensation amount to the backlight unit 500. Accordingly, the luminance of each unit block can be compensated.

For example, the backlight dimming controller 510 may read the luminance compensation amount of the first unit block 1511 from memory and transmit a fifth dimming signal reflecting the read luminance compensation amount to the backlight unit 500.

In another embodiment, the backlight dimming controller 510 may calculate a first luminance amount corresponding to the first unit block 1511 and a second luminance amount corresponding to the second unit block 1531.

The backlight dimming controller 510 may obtain a value obtained by subtracting the first luminance amount from the second luminance amount as the luminance compensation amount.

The backlight dimming controller 510 may adjust the dimming curve of each of the plurality of first unit blocks included in the first local area 1511 according to the calculated luminance compensation amount.

The dimming curve may be a curve representing the characteristics of the dimming value of the unit block. The horizontal axis of the dimming curve may be a grayscale value from 0 to 255, and the vertical axis may be a dimming value from 0% to 100%.

The backlight dimming controller 510 may generate a fifth dimming signal reflecting the calculated luminance compensation amount and transmit the generated fifth dimming signal to the backlight unit 250.

The fifth dimming signal may include a dimming value for controlling each of the plurality of first unit blocks 1511.

The backlight dimming controller 510 may adjust the dimming curve of each of the plurality of first unit blocks 1511 to reflect the luminance compensation amount (reduction amount of luminance). The backlight dimming controller 510 may adjust the dimming curve so that the dimming value increases compared to the same gray level value.

The backlight dimming controller 510 generates a second dimming signal and transmits the second dimming signal to the backlight unit 510.

The second dimming signal may include a dimming value for controlling each of the plurality of second unit blocks 1531.

In the case of the dual structure according to the embodiment of FIG. 15, the number of LEDs included in the first unit block 1511 is greater than the number of LEDs included in the second unit block 1531 having the same size as the first unit block 1511 and the density of LEDs is also high.

Accordingly, not only can the resolution of the central area, which is mainly perceived by the viewer, be increased, but the contrast ratio of the peripheral part of the displayed image can be improved, thereby improving picture quality.

The present disclosure described above can be implemented as computer-readable code on a program-recorded medium. Computer-readable media includes all types of recording devices that store data that can be read by a computer system. Examples of computer-readable media may include HDD (Hard Disk Drive), SSD (Solid State Disk), SDD (Silicon Disk Drive), ROM, RAM, CD-ROM, magnetic tape, floppy disk, optical data storage device, etc.

Additionally, the computer may include a controller 170 of the display device 100.

What is claimed is:

1. A display device comprising:

a power supply;

a display panel configured to output an image;

a backlight including a plurality of backlight unit blocks configured to provide light to the display panel; and a backlight dimming controller configured to control the light provided by the backlight to correspond to the image output by the display panel, wherein an entire area of the display panel is divided into a first local area including a plurality of first unit blocks and a second local area including a plurality of second unit blocks, each of the plurality of first unit blocks including a plurality of light emitting diodes (LEDs), and each of the plurality of second unit blocks including a plurality of LEDs, wherein a size of one of the plurality of first unit blocks is different from a size of one of the plurality of second unit blocks, and wherein a number of the plurality of LEDs included in the one of the plurality of first unit blocks is identical to a number of the plurality of LEDs included in the one of the plurality of second unit blocks.

2. The display device of claim 1, wherein the size of the one of the plurality of first unit blocks is smaller than the size of the one of the plurality of second unit blocks.

3. The display device of claim 1, wherein a spacing between adjacent LEDs included in the one of the plurality of first unit blocks is different from a spacing between adjacent LEDs included in the one of the plurality of second unit blocks.

4. The display device of claim 1, wherein the backlight dimming controller is further configured to:

calculate a luminance compensation amount of the one of the plurality of first unit blocks, and transmit a dimming signal reflecting the calculated luminance compensation amount to the backlight.

5. The display device of claim 4, wherein the backlight dimming controller is further configured to:

calculate a first luminance amount corresponding to the one of the plurality of first unit blocks, calculate a second luminance amount corresponding to the one of the plurality of second unit blocks, and calculate a difference between the first luminance amount and the second luminance amount as being the luminance compensation amount.

6. The display device of claim 4, further comprising a memory configured to store the luminance compensation amount corresponding to the one of the plurality of first unit blocks, wherein the backlight dimming controller is further configured to:

read the luminance compensation amount from the memory, and transmit the dimming signal reflecting the read luminance compensation amount to the backlight.

7. The display device of claim 1, wherein a spacing between adjacent LEDs included in the one of the plurality of first unit blocks is smaller than a spacing between adjacent LEDs included in the one of the plurality of second unit blocks.

8. The display device of claim 1, wherein a luminous efficiency of the LEDs included in the one of the plurality of first unit blocks is higher than a luminous efficiency of the LEDs included in the one of the plurality of second unit blocks.

9. The display device of claim 1, wherein the first local area is a central area of the entire area of the display panel and the second local area is an outer area surrounding the central area.

10. The display device of claim 1, wherein the first unit blocks are equal in size, and the second unit blocks are equal in size.

* * * * *